United States Patent
Merz et al.

(10) Patent No.: US 8,673,147 B2
(45) Date of Patent: Mar. 18, 2014

(54) CONTAINER FOR FILTERING LIQUID HAVING AN OUTLET APERTURE FOR AIR

(75) Inventors: Alexandra Merz, Taunusstein (DE); Gunder Guckes, Waldems (DE); Stefan Hother, Wiesbaden (DE); Berthold Conradt, Wiesbaden (DE); Bernd Freystedt, Wiesbaden (DE)

(73) Assignee: Brita GmbH, Taunusstein (DE)

( * ) Notice: Subject to any disclaimer, the term of this patent is extended or adjusted under 35 U.S.C. 154(b) by 245 days.

(21) Appl. No.: 12/736,173

(22) PCT Filed: Mar. 16, 2009

(86) PCT No.: PCT/EP2009/053056
§ 371 (c)(1),
(2), (4) Date: Sep. 17, 2010

(87) PCT Pub. No.: WO2009/115482
PCT Pub. Date: Sep. 24, 2009

(65) Prior Publication Data
US 2011/0005991 A1    Jan. 13, 2011

(30) Foreign Application Priority Data
Mar. 20, 2008    (DE) .......................... 10 2008 015 112

(51) Int. Cl.
*B01D 24/12*    (2006.01)
*B01D 35/01*    (2006.01)

(52) U.S. Cl.
USPC ............ 210/282; 210/472; 210/484; 210/498

(58) Field of Classification Search
USPC ......... 210/282, 289, 291, 293, 436, 464, 472, 210/474, 482, 484, 485, 498
See application file for complete search history.

(56) References Cited

FOREIGN PATENT DOCUMENTS

| | | |
|---|---|---|
| DE | 198 14 008 A1 | 9/1999 |
| DE | 19814008 A1 | 9/1999 |
| DE | 198 46 380 A1 | 4/2000 |
| DE | 19846380 A1 | 4/2000 |
| DE | 10 2005 062 885 A1 | 6/2007 |
| DE | 102005062855 A1 | 6/2007 |
| DE | 202007003927 U1 | 6/2007 |
| EP | 219004 A2 * | 4/1987 ................... 210/485 |
| EP | 0 823 276 A1 | 2/1998 |
| EP | 0823276 A1 | 11/1998 |
| JP | 2000-42536 A | 2/2000 |
| WO | 9631440 A1 | 10/1996 |
| WO | WO 96/31440 A1 | 10/1996 |
| WO | 0132560 A2 | 5/2001 |
| WO | WO 01/32560 A2 | 5/2001 |
| WO | 0147399 A2 | 7/2001 |
| WO | 2004014519 A2 | 2/2004 |

* cited by examiner

*Primary Examiner* — Matthew O Savage
(74) *Attorney, Agent, or Firm* — Hudak, Shunk & Farine Co. LPA

(57) ABSTRACT

A container for the filtration of liquid is described, which has a cup and a cover mounted on the cup. The cup is at least partly filled with a filter material and has at least one outlet window for the liquid. The cover has at least one inlet window and at least one outlet window for air, wherein at least the windows have lattice-like structures with lattice openings. The air outlet window has at least one recess extending inward from the plane of the window, which is provided at least partially with at least one lattice structure.

20 Claims, 6 Drawing Sheets

CONTAINER FOR FILTERING LIQUID HAVING AN OUTLET APERTURE FOR AIR

FIELD OF THE INVENTION

The invention concerns a container for the filtration of liquid, with a cup, which is at least partly filled with a filter material and has at least one outlet window for the liquid, and with a cover mounted on the cup, which has at least one inlet window for the liquid and at least one outlet window for air, wherein at least the inlet window and the air outlet window have lattice-like structures with lattice openings.

BACKGROUND OF THE INVENTION

Such containers are also known as filter cartridges, and they are generally used in gravity-operated filter devices. Such filter devices are primarily used in the household, especially for filtration of water.

The filter cartridges are loaded with filter materials, especially in granular form.

In the filter device, the filter cartridges are inserted into a water funnel, into which the water being filtered is poured. The water funnel is placed in a jug, which catches the filtered water.

The filter cartridges are only temporarily used, namely, when filtered water is required. At the very start of the filtration process the filter cartridges must assure a flawless passage of the water, on the one hand letting the air contained in the filter cartridge escape unhindered and on the other hand preventing the filter material from getting into either the water prior to filtering or the filtered water.

A filter cartridge is known from EP 0 823 276 B1, which has a cup partially filled with filter material and a cover placed on the cup. The cover is in the form of a hood and it has air venting slots in its sides and water inlet openings in the form of a crown. To prevent small granular particles from getting through the openings in the cover to the outside and possibly blocking the openings in the cover, a fabric insert with shape-holding ribs is provided, which is fastened in the region of the edge of the cover and protrudes into the interior of the cup. To break the surface tension, the fabric insert makes contact with the filter material. At this contact site, the liquid begins to flow and forces out any air cushion underneath the cover, thus preventing any back pressure opposing the pressure of the liquid column. This is supposed to let the liquid being filtered flow without problems through the filter material and hold back the small particles of the filter material in excellent manner.

In WO 01/32560, however, it is stated that flow problems occur if contact between fabric insert and filter material is not assured.

On the one hand, drying out of the filter material can lower the level of the filter material, so that the desired contact is no longer assured. On the other hand, sometimes too much filter material can be filled into the cup, so that too large a pressure is exerted on the inwardly projecting fabric insert, and this is further intensified by a vigorous expansion of the filter material when exposed to hard water, which can lead to cracking of the filter cartridge.

To obviate this problem, it was proposed in WO 01/32560 to provide for a flexible, screenlike, textile sheet structure instead of the rigid fabric insert, projecting upward into the cover when water flows in. As the water level drops, the sheet structure is pulled downward.

The solutions in both documents have the drawback that a screenlike fabric must be provided, spanning the entire opening of the cover, in addition to the windows in the cover. Neither of the two solutions has satisfactorily eliminated the sail effect and thus the hindering of the flow.

SUMMARY OF THE INVENTION

Therefore, the purpose of the invention is to create a container in which the inflow of liquid, especially water, and the simultaneous outflow of air occurs with no problems, and the cover of the container can be made in simple manner.

This problem is solved with a container in which the air outlet window has at least one recess extending inward from the plane of the window, which is provided at least partially with at least one lattice structure.

By the plane of the window is meant the plane which is defined by the opening in the cover. Therefore, the plane of the window lies in the plane of the wall of the cover, bounding the opening.

The solution according to the invention is based on the knowledge that one does not need an additional screenlike structure between cover and cup if the lattice-like structure of the air outlet window is drawn inward in the form of a recess, preferably far enough so that it touches the filter material. The recess extends inward from the plane of the window. In the plane of the window, the air outlet window has no structure, so that the recess is open at the top.

The depth T of the recess is preferably larger than the maximum diameter D of the air outlet window.

The area of the lattice-like structure of the air outlet window is considerably enlarged by the recess. Especially when the recess extends far into the interior of the container, down to the edge of the cover.

The advantage of the increased area can be especially utilized if the cover is curved on top and fashioned as a hood, for example.

The air outlet window is preferably located at the highest situated point of the cover. The air outlet window is preferably arranged in the middle of the cover.

It is advantageous if the recess touches the filter material, because then the sail effect on the lattice structure of the air outlet window is interrupted. The recess can also dip partly into the filter material.

Preferably, the recess has grooves on its inner surface extending in the vertical direction, at the bottom of which openings are arranged. In this way, conduits are formed for the air to rise through, and the air outlet is favored by the openings located in the bottom of the grooves.

The term "inner surface" means that surface of the recess turned toward the interior of the container. Accordingly, the outer surface of the recess means that surface lying on the outside with regard to the container.

Preferably, the lattice structure on the inner surface of the recess has vertical ridges and on the outer surface of the recess it has horizontal ridges. In this embodiment, the horizontal and vertical ridges are not arranged in a single plane, but rather staggered to each other. Thus, the grooves are formed between the vertical ridges.

The openings are bounded by the spaced-apart horizontal and spaced-apart vertical ridges and preferably have a rectangular form. The dimensions of the openings lie preferably in the range of 100 μm to 300 μm, especially in the range of 150 μm to 250 μm.

Preferably, the recess has a bottom wall and a circumferential wall, and the lattice structure is arranged at least in the circumferential wall.

The lattice structure can also extend completely across the entire circumferential wall.

The bottom is preferably formed with a bottom lattice structure. Preferably, the lattice structures of bottom wall and circumferential wall are different. The differences consist in that the lattice structures in the bottom are arranged preferably horizontally in a plane, while the lattice structure of the circumferential wall is arranged preferably in different planes, especially in stairway manner.

The differences are necessary so that no particles of the filter material can get stuck in the bottom wall and thereby block the openings.

Preferably, the recess has the form of a truncated cone. This form is especially suitable for dipping the recess into the filter material. Depending on its configuration, the truncated cone can be more or less tapered toward the bottom. The conical shape has the advantage that the air rising in the conduits of the recess formed by outer grooves is taken more efficiently to the air outlet openings.

The horizontal ridges preferably have a triangular cross section, narrowing toward the bottom, which further favors the air venting.

The vertical ridges can narrow from top to bottom, so that the usable width can be kept constant along the entire length. Conduits with constant cross section have the advantage that the rising air is uniformly taken to the top without the air flow becoming detached.

Further preferred embodiments of the recess are a cylinder, a cube, a truncated pyramid, or a partial sphere or hemisphere.

In the spherical embodiments, a distinction can be drawn between circumferential and bottom wall, so that a lattice structure provided for the circumferential wall is preferably arranged in the spherical surface. According to one special embodiment, a bottom wall structure is provided in the underlying apex region of the sphere, which can be directly or indirectly adjoined by the lattice structure of the circumferential wall.

Preferably, the recess consists of a shape-stable material. In this way, contact with the filter material is ensured even during the filtration process. It has been found that the expansion of the filter material is no problem, because the recess is confined to the region of the air outlet window and thus sufficient volume is available beneath the cover for the expansion of the filter material.

Plastic material is preferred for the recess. According to another embodiment, the cover and the recess can consist of different materials.

Preferably, at least the lattice structure of the water inlet window and the lattice structure of the recess consist of different materials.

Preferably, the cover with the recess is produced in the 2-component injection molding process. Thus, the possibility exists of selecting the material of the recess independently of the material of the cover and thus to better adapt the material of the lattice structure to the flow conditions. The advantage is that a subsequent welding in of a fabric or a lattice structure is not necessary.

It is preferable for the lattice structure(s) of the recess to be made from a hydrophobic material and the lattice structure of the water inlet window from a hydrophilic material.

BRIEF DESCRIPTION OF THE DRAWINGS

Sample embodiments of the invention shall be explained more closely by means of the drawings. These show.

FIG. 1 shows a container 1, which has a cup 2 and a cover 10. The cup 2 has a bottom wall 4, the to end of the cup including an upper peripheral flange with an upwardly facing surface, a cup edge 5, which also can be used as a sealing edge, and a circumferential wall 3, and it is filled with filter material 9. The bottom wall 4 has a recess 6 with a fixation element 7 arranged on the inside, by which the container 1 can be fastened in a water funnel (not shown). The bottom wall 4, moreover, has water outlet windows 8, which are provided with a lattice-like structure, which prevents the filter material 9 from escaping downward into a container (not shown) that receives the filtered water.

Figure 1:
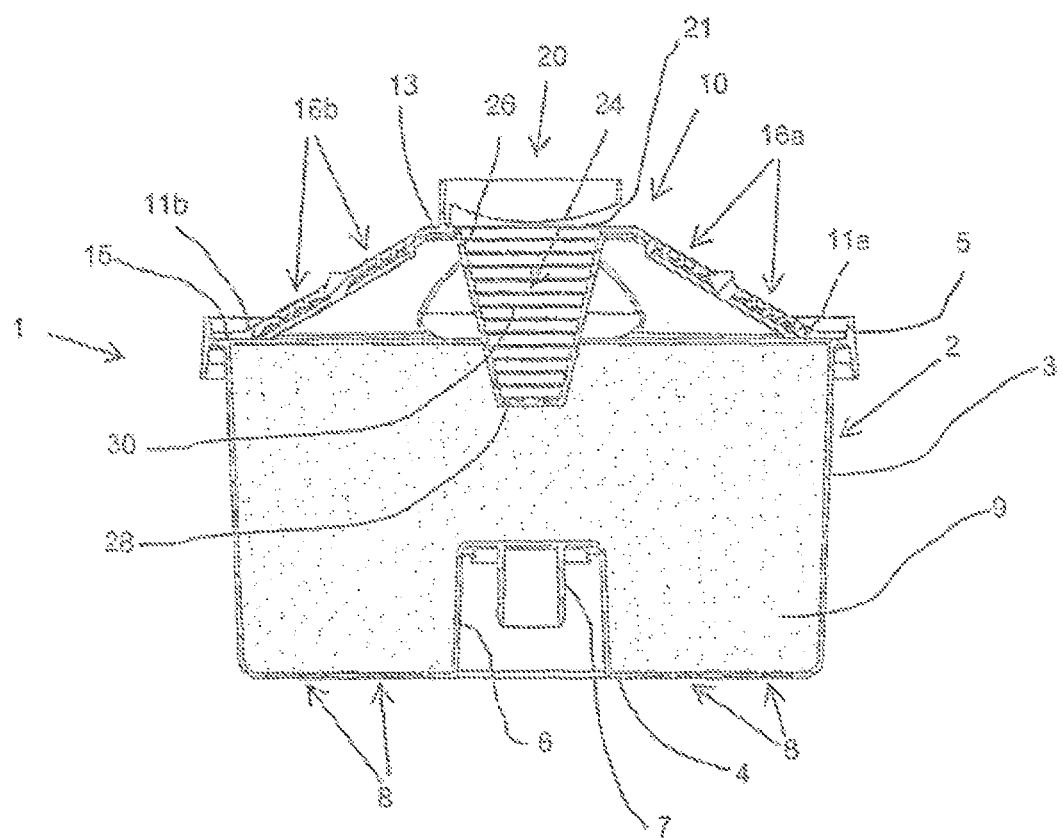
FIG. 1, a vertical section through a container,
FIG. 2, a top view of the container shown in FIG. 1,
FIG. 3, an outer view of the conical recess,
FIG. 4, a section through the conical recess of FIG. 3, and
FIGS. 5a, b, c-7a, b, c, views and sections of recesses according to three other embodiments.

The cover 10 is curved on top and fashioned as a hood, and in the representation shown here it has a roughly trapezoidal cross section with window walls 11a, 11b and a cover wall 13. In the window walls 11a, 11b are arranged water inlet windows 16a, 16b, through which the water being filtered flows into the container 1. The cover has an outer peripheral flange with a downwardly facing surface that is mounted to the upwardly facing surface of the cup. An air outlet window 20 is arranged in the middle of the cover wall 13 and, thus, also at the highest point of the cover 10.

The air outlet window 20 has a truncated conical recess 24, which extends from the plane of the window into the interior. The recess 24 has a conical circumferential wall 26 and a round, horizontal bottom wall 28. The recess 24 extends to below the edge of the cover 15 and its lower region dips into the filter material 9. In one embodiment, the cover 10 is curved on top and the turned-in part 24 extends, in relation to a vertical distance, at least down to the edge 15 of the cover 10.

The recess 24 has a lattice structure 30, which will be explained more closely in conjunction with FIGS. 3 and 4. When the water flows in through the water inlet windows 16a, 16b, the air inside the container 1 is displaced and exits the container through the air outlet window 20, i.e., through the lattice structure 30 of the recess 24. In this case, the air must escape to the outside against the water column located inside the recess 24. In one embodiment the recess 24 has bottom wall 28 and a circumferential wall 26 connected to the bottom wall, and the lattice structure 30 is arranged at least in the circumferential wall 26. In one embodiment the bottom wall 28 is outfitted at least partially with the bottom lattice structure 29. In one embodiment the lattice structures 30,29 of bottom wall 28 and circumferential wall 26 are different. In one embodiment the recess 24 has the form of a truncated cone.

Figure 2:
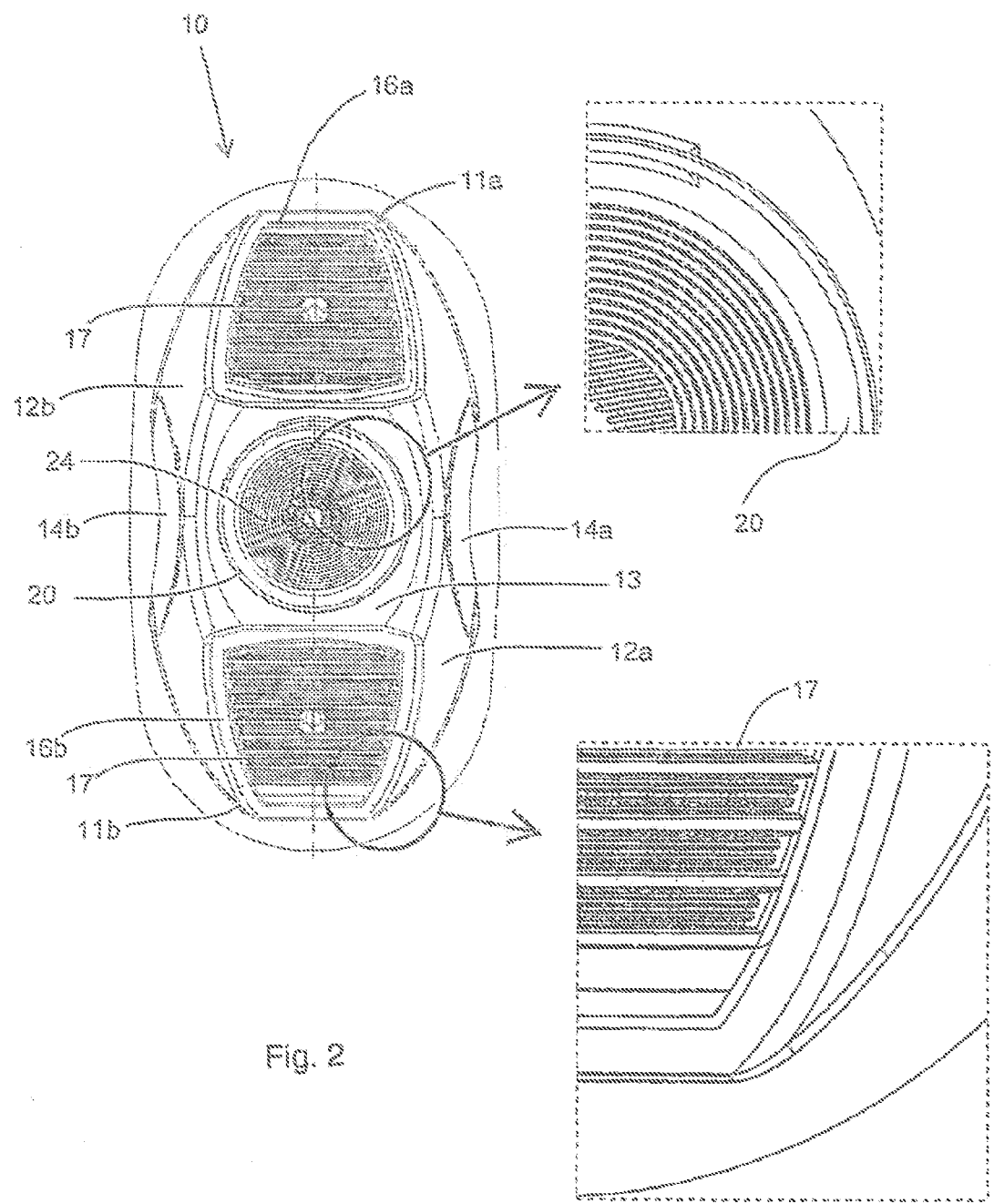

FIG. 2 shows a top view of the cover 10. To show the lattice structures more clearly, the encircled regions are also shown on magnified scale. In the two window walls 11a, 11b, the water inlet windows 16a, 16b are shown with the corresponding lattice structures 17 for almost the entire area. Preferably, the lattice structures 17 consist of a hydrophilic material, especially a plastic.

The side walls 12a, 12b of the cover 10 have a recessed grip 14a, 14b in the middle for grasping the cover 10 and thus the container 1.

In the middle of the cover wall 13 is arranged the air outlet window 20, having the recess 24. In the plane of the cover wall 13 and thus in the plane of the window 21 (see FIG. 1) there is no lattice structure, so that the interior of the recess 24 is freely accessible.

The cover 10 consists of a plastic material. The recess 24 preferably consists of a hydrophobic material, which favors the venting of air against the water column. The cover 10 with the recess 24 is preferably made in the 2-component method.

Figure 3:
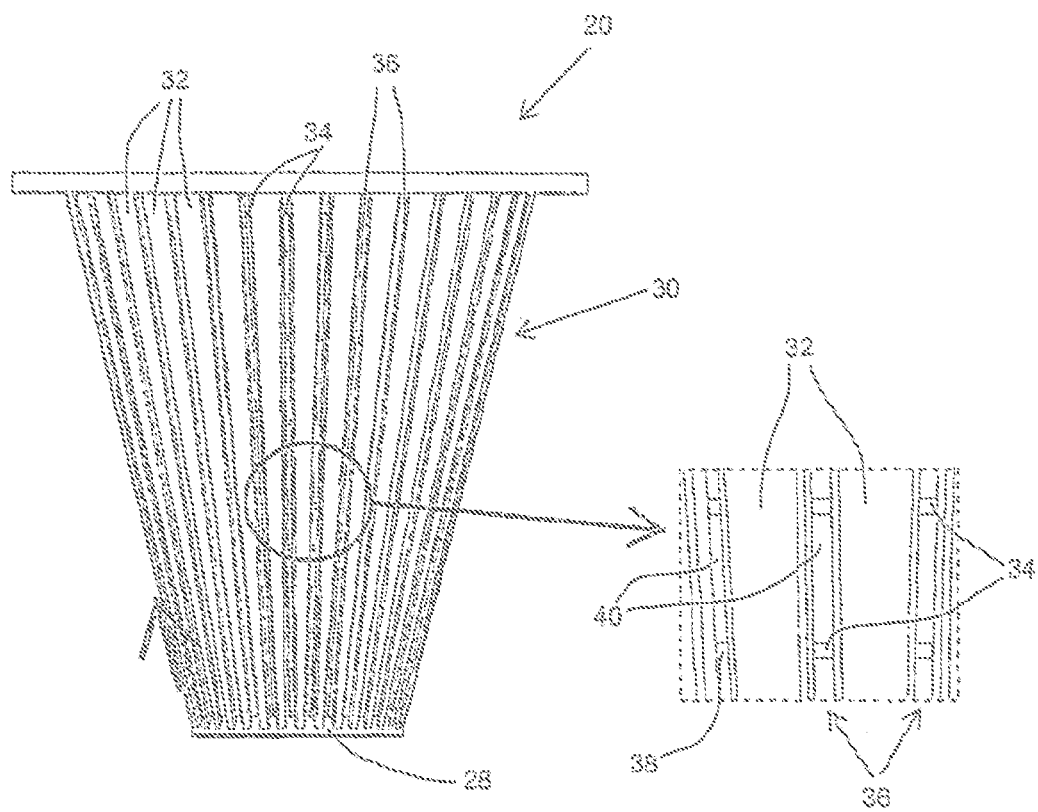

FIG. 3 shows on magnified scale a side view of the recess 24 shown in FIG. 1 and arranged in the air outlet window 20. The conical recess 24 is formed by a lattice structure 30, formed from vertical ridges 32 and horizontal ridges 34. The vertical ridges 32 are arranged on the inner surface of the recess so that an air guidance groove or air conduit 36 is formed between the vertical ridges, so that the air, which is forced out from bottom to top (see arrow), is taken upward and to the openings 40 in the bottom of the groove 38, thanks to the slope of the cone. The bottom of the groove 38 (see magnified feature) is formed by the inner encircling horizontal ridges 34. The dimensions of the openings lie in the range of 100 µm to 300 µm.

The bottom wall 28 has a lattice structure 29, which is preferably arranged horizontally in a plane, the dimensions of the openings also lying in the range of 100 µm to 300 µm, especially in the range of 150 µm to 250 µm.

Figure 4:
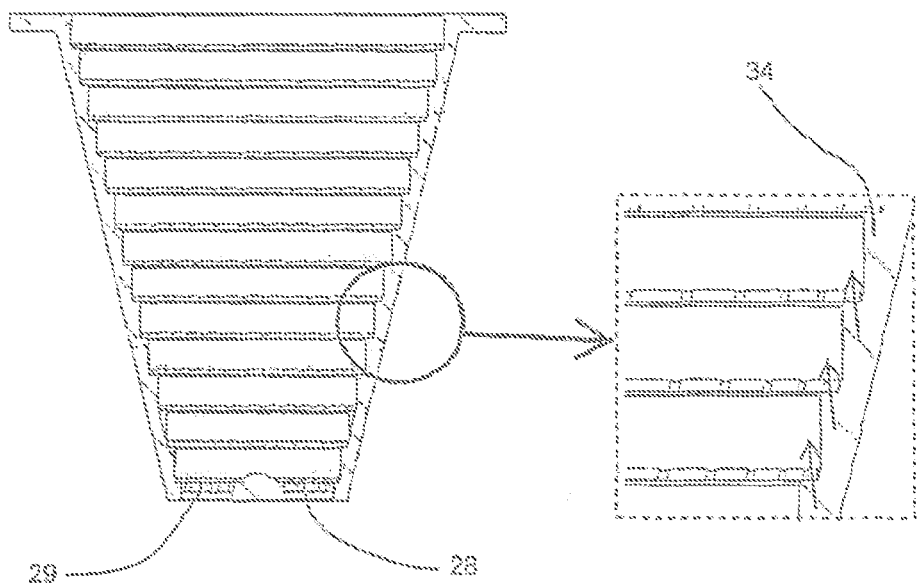

FIG. 4 shows a vertical section through the conical recess of FIG. 3. As can be seen, the horizontal ridges 34 have a triangular contour in cross section (see magnified feature). This favors the venting of air, as indicated by the arrows.

Figure 5:
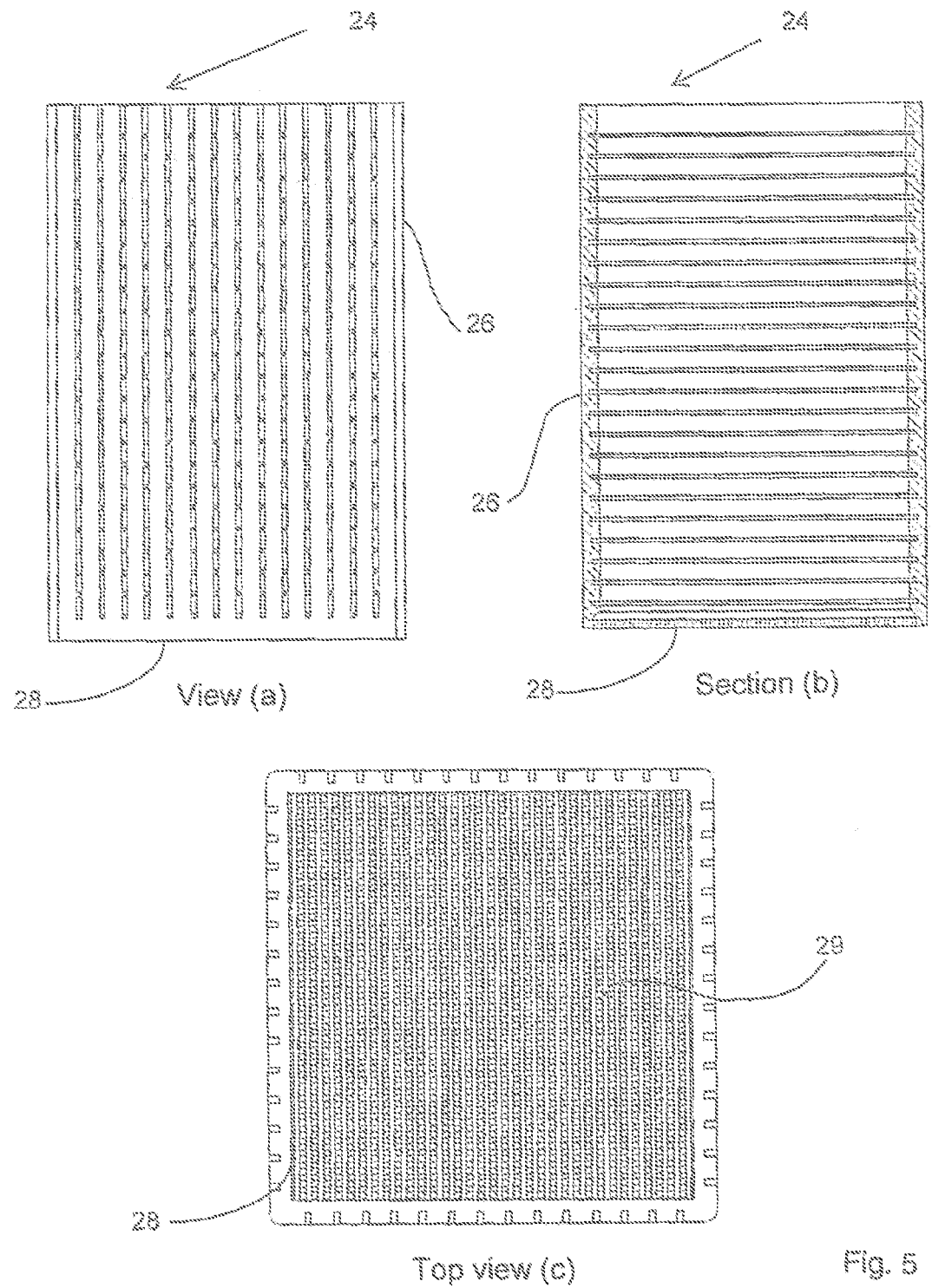
Figure 6:
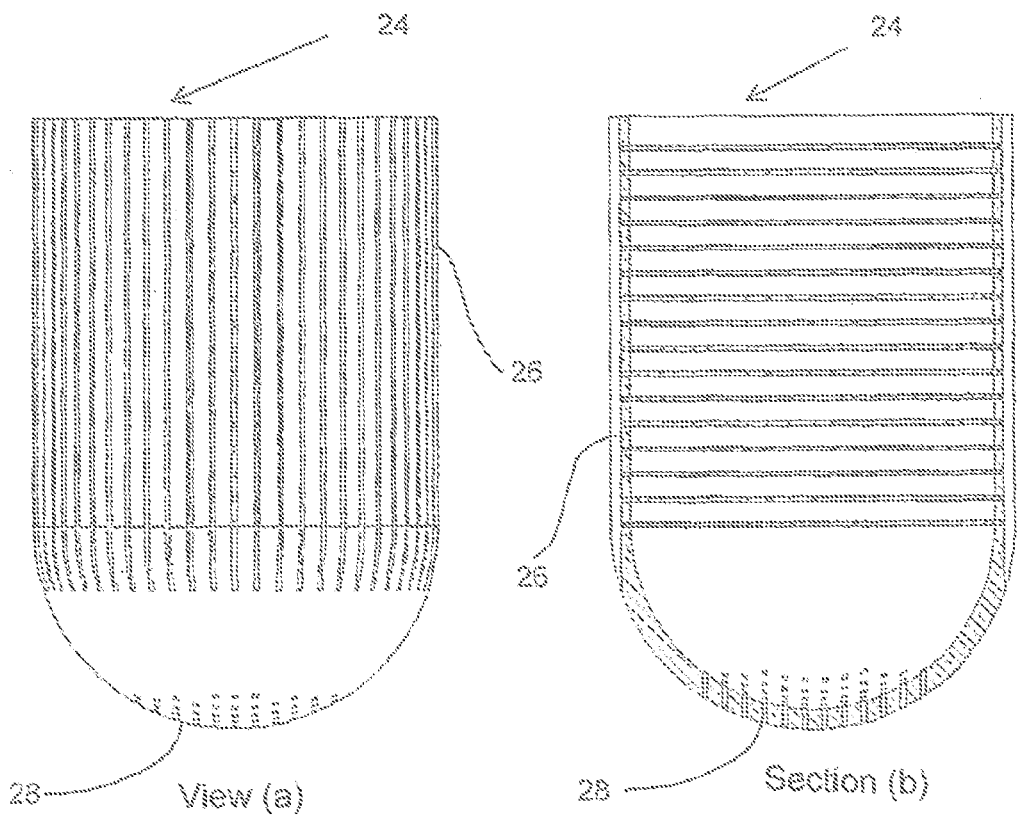
Figure 6:
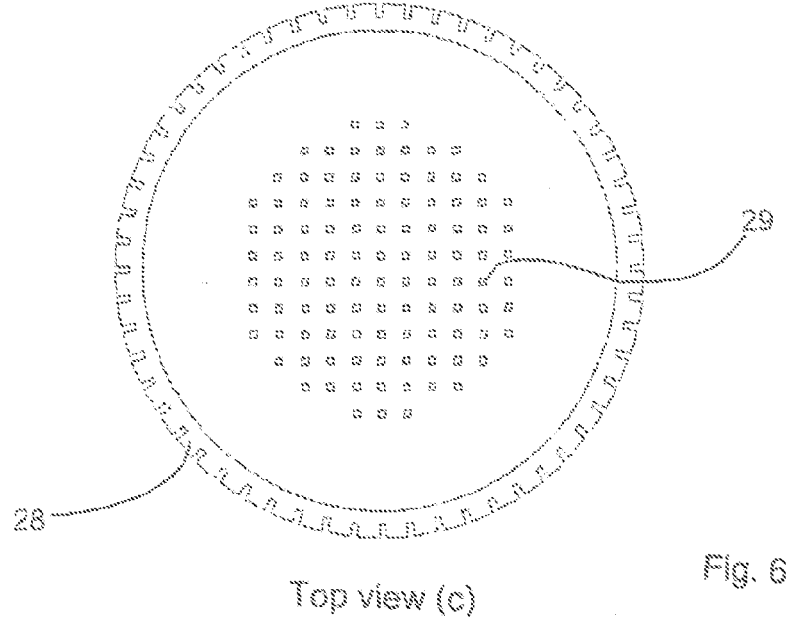
Figure 7:
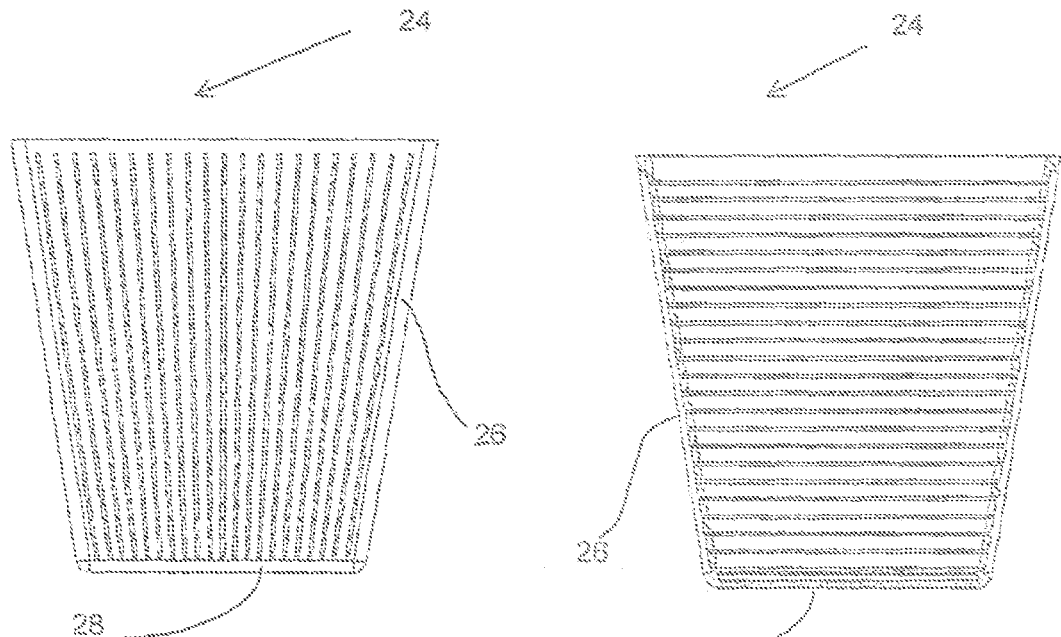
Figure 7:
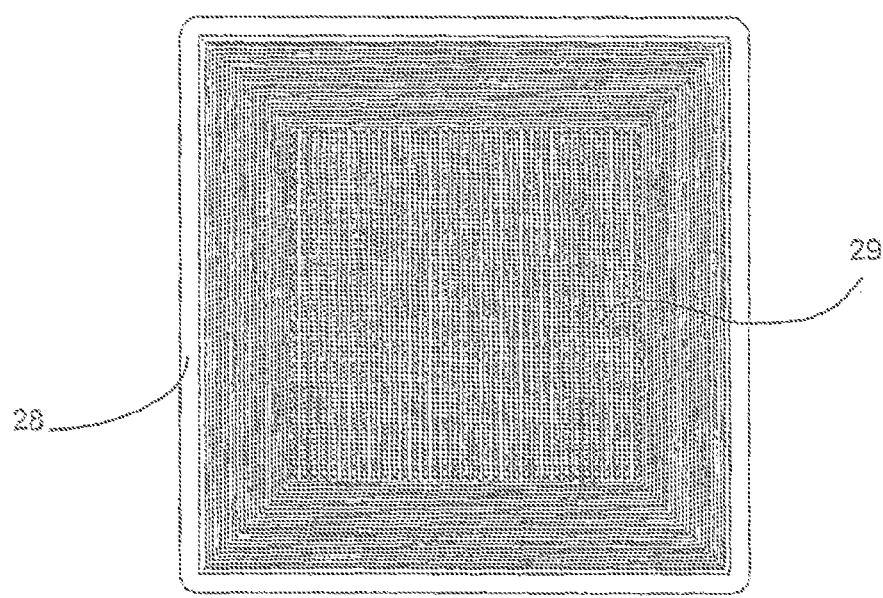

FIGS. 5a, b, c to 7a, b, c show further embodiments: side view in figures a, vertical section in figures b, and bottom view in figures c. FIG. 5 shows a cubical recess 24 with square bottom wall 28, FIG. 6 a cylindrical recess 24 with hemispherical bottom wall 28, and FIG. 7 a truncated pyramidal recess 24 with square bottom wall 28.

LIST OF REFERENCE SYMBOLS

1 container
2 cup
3 circumferential wall
4 bottom wall
5 edge of cup
6 recess
7 fixing element
8 water outlet window
9 filter material
10 cover
11a, b window wall
12a, b side wall
13 cover wall
14a, b recessed grip
15 edge of cover
16 water inlet window
17 lattice structure
20 air outlet window
21 window plane
22 edge of window
24 recess
26 circumferential wall
28 bottom wall
29 bottom lattice structure
30 lattice structure
32 vertical ridge
34 horizontal ridge
36 groove
38 bottom of groove
40 opening

What is claimed is:

1. A container for the filtration of liquid, comprising: a cup, which is at least partly filled with a filter material, wherein the cup has an upper peripheral flange with an upwardly facing surface and at least one outlet window at a bottom of the cup for the liquid to exit the cup, and a cover having an outer peripheral flange with a downwardly facing surface mounted on the upwardly facing surface of upper peripheral flange of the cup, wherein the cover has at least one inlet window for the liquid and at least one outlet window for air, wherein the at least one inlet window for liquid and the at least one outlet window for air are positioned above said upwardly facing surface and the at least one outlet window for air is positioned above the at least one inlet window for the liquid relative to said upwardly facing surface, wherein the at least one inlet window for the liquid has a first lattice structure with lattice openings, wherein the first lattice structure is positioned above said upwardly facing surface, wherein the at least one outlet window for air has a second lattice structure with lattice openings, wherein the second lattice structure defines a recess that extends inwardly into the container from a plane of the outlet window for air to a level below said upwardly facing surface for permitting a passage of air from an interior of the container to an exterior of the container.

2. The container per claim 1, wherein the recess at least touches the filter material.

3. The container per claim 1, wherein the recess dips partly into the filter material.

4. The container per claim 1, wherein the recess has grooves on its inner surface extending in a vertical direction, at a bottom of which openings are arranged.

5. The container per claim 4, wherein the at least one second lattice structure located on the inner surface of the recess has vertical ridges and on an outer surface of the recess it has horizontal ridges.

6. The container per claim 5, wherein the recess has the form of a truncated cone.

7. The container per claim 6, wherein the horizontal ridges have a triangular cross section.

8. The container per claim 6, wherein the vertical ridges narrow from top to bottom.

9. The container per claim 1, wherein the openings are rectangular.

10. The container per claim 1, wherein the recess has a bottom wall and a circumferential wall connected to the bottom wall, and the at least one second lattice structure is arranged at least in the circumferential wall.

11. The container per claim 10, wherein the bottom wall is outfitted at least partially with the at least one second lattice structure.

12. The container per claim 10, wherein the at least one second lattice structures of bottom wall and circumferential wall are different.

13. The container per claim 1, wherein the recess has the shape of a cylinder, a cube, or a truncated pyramid.

14. The container per claim 1, wherein the recess consists of a shape-stable material.

15. The container per claim 1, wherein the cover consists of a plastic material.

16. The container per claim 1, wherein at least the first lattice structure of the inlet window and the at least one second lattice structure of the recess consist of different materials.

17. The container per claim 1, wherein the cover with recess is produced in the 2-component injection molding process.

18. The container per claim 1, wherein the second lattice structure of the outlet window for air consists of a hydrophobic material.

19. The container per claim 1, wherein the first lattice structure of the inlet window consists of a hydrophilic material.

20. A container for the filtration of liquid, comprising: a cup, which is at least partly filled with a filter material, wherein the cup has an upper peripheral flange with an upwardly facing surface and at least one outlet window at a bottom of the cup for the liquid to exit the cup, and a cover having an outer peripheral flange with a downwardly facing surface with a bottom edge mounted on the upwardly facing surface of upper peripheral flange of the cup, wherein the cover has at least one inlet window for the liquid and at least one outlet window for air, wherein the at least one inlet window for liquid and the at least one outlet window for air are positioned above said downwardly facing surface and the at least one outlet window for air is positioned above the at least one inlet window for the liquid relative to said downwardly facing surface, wherein the at least one inlet window for the liquid has a first lattice structure with lattice openings, wherein the first lattice structure is positioned above said upwardly facing surface, wherein the at least one outlet window for air has a second lattice structure with lattice openings, wherein the second lattice structure defines a recess that extends inwardly into the container from a plane of the outlet window for air at least down to a level of said bottom edge of said downwardly facing surface for permitting a passage of air from an interior of the container to an exterior of the container.

\* \* \* \* \*

UNITED STATES PATENT AND TRADEMARK OFFICE
CERTIFICATE OF CORRECTION

| | | |
|---|---|---|
| PATENT NO. | : 8,673,147 B2 | Page 1 of 1 |
| APPLICATION NO. | : 12/736173 | |
| DATED | : March 18, 2014 | |
| INVENTOR(S) | : Alexandra Merz et al. | |

It is certified that error appears in the above-identified patent and that said Letters Patent is hereby corrected as shown below:

In the Specification

In column 4, line 4, "bottom wall 4, the to end", should be replaced with --bottom wall 4, the top end--

Signed and Sealed this
Third Day of June, 2014

Michelle K. Lee
*Deputy Director of the United States Patent and Trademark Office*